С
3,560,552
3-OXYGENATED 2-METHYL-5-OXOCYCLOPENT-1-
ENEHEPTANOIC ACIDS AND ESTERS THEREOF
Masateru Miyano, Morton Grove, Ill., assignor to
G. D. Searle & Co., Chicago, Ill.
No Drawing. Filed Oct. 28, 1968, Ser. No. 771,300
Int. Cl. C07c 61/36, 69/74
U.S. Cl. 260—468                                           10 Claims

ABSTRACT OF THE DISCLOSURE

The condensation of 3-oxoundecane-1,11-dioic acid with pyruvic aldehyde affords 3-hydroxy-2-methyl-5-oxocyclopent-1-eneheptanoic acid, which is converted to the other novel compounds of this invention by acylation or oxidation of the hydroxy group or by esterification of the carboxylic acid group. These compounds display valuable pharmacological, e.g. anti-inflammatory, properties and are useful also as anti-germinant agents.

---

The present invention is concerned with novel substituted cyclopent-1-eneheptanoic acids and esters and, more particularly, with 3-oxygenated 2-methyl-5-oxocyclopent-1-eneheptanoic acids and esters thereof represented by the following structural formula

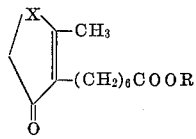

wherein R can be hydrogen or a lower alkyl radical and X is a carbonyl, hydroxymethylene or (lower alkanoyl) oxymethylene radical.

The lower alkyl radicals denoted in the foregoing structural representation are typified by methyl, ethyl, propyl, butyl, pentyl, hexyl, heptyl and the branched-chain groups isomeric therewith.

Examples of the lower alkonyl radicals encompassed in the X term are formyl, acetyl, propionyl, butyryl, valeryl, caproyl, heptanoyl and the branched-chain isomers thereof.

Suitable starting materials for the manufacture of the instant compounds are 3-oxoundecane-1,11-dioic acid and pyruvic aldehyde. Condensation of those two substances in aqueous solution affords 3-hydroxy-2-methyl-5-oxocyclopent-1-eneheptanoic acid. Reaction of that acid with a diazoalkane affords the corresponding lower alkyl esters. When the diazoalkane is diazomethane, for example, there is thus produced methyl 3-hydroxy-2-methyl-5-oxocyclopent-1-eneheptanoate.

Acylation of the instant 3-hydroxy compounds with a lower alkanoic acid anhydride or halide, preferably in the presence of a suitable acid acceptor such as pyridine, triethylamine, etc., affords the corresponding 3-(lower alkanoyl)oxy derivatives. Methyl 3-hydroxy-2-methyl-5-oxocyclopent-1-eneheptanoate, when allowed to react with acetic anhydride and pyridine at room temperature, thus yield methyl 3-acetoxy-2-methyl-5-oxocyclopent-1-eneheptanoate.

Oxidation of the 3-hydroxy group of the compounds of this invention is conveniently accomplished by reaction with a reagent such as aqueous chromic acid. When 3-hydroxy-2-methyl-5-oxocyclopent-1-eneheptanoic acid in methylene chloride is contacted with aqueous chromic acid, there is thus produced 2-methyl-3,5-dioxocyclopent-1-eneheptanoic acid.

The compounds of this invention are useful as a result of their valuable pharmacological properties. They are, for example, anti-inflammatory agents as is evidenced by their ability to inhibit the edematous swelling associated with inflammatory responses. In addition, they display anti-germinant activity, in particular against *Trifolium repens*.

The anti-inflammatory property of the instant compounds is specifically illustrated by the activity of 3-hydroxy-2-methyl-5-oxocyclopent-1-eneheptanoic acid and methyl 3-hydroxy-2-methyl-5-oxocyclopent-1-eneheptanoate when tested in the following assay:

Each of a group of 10 intact male rats weighing 100–130 g. is injected under the plantar surface of each hind foot with 0.1 ml. of a 1% solution of carrageenin (Type 402, Marine Colloids, Inc.). The test compound, dissolved or suspended in saline, corn oil or propylene glycol, is administered subcutaneously or intragastrically 1 hour prior to the carrageenin injection. The doses normally used are 25 mg. per rat subcutaneously and 5 mg. per rat intragastrically. Another such group serving as controls is treated in the identical manner save for omission of the test compound. The edema resulting from carrageenin injection is determined by measuring the circumference of the hind feet, in arbitrary units, 5 hours after the carrageenin injection and subtracting the average swelling of the group treated with the test compound from the average swelling of the control group. Compounds are rated active if they produce a significant decrease ($P<0.05$) in the swelling observed in control animals.

Representative of the anti-germinant property of the compounds of this invention is the activity of 3-hydroxy-2-methyl-5-oxocyclopent-1-eneheptanoic acid and methyl 3-acetoxy-2-methyl-5-oxocyclopent-1-eneheptanoate when tested in the following assay:

Into each of two 60 mm. Petri dishes is placed a stack of three 42.5 mm. filter paper discs and each stack is moistened with 2 ml. of distilled water. Ten *Trifolium repens* (white clover) seeds are then arranged at approximately equal intervals around the periphery of each stack and approximately 5 mg. of the test compound is placed in the center of one seed circle. The other dish serves as a control. The dishes are then covered with glass lids and incubated at room temperature for 10 days, at the end of which time germination in the two dishes is compared.

The invention will appear more fully from the examples which follow. These examples are set forth by way of illustration only and it will be understood that the invention is not to be construed as limited either in spirit or in scope by the details contained therein as many modifications both in materials and methods will be apparent from this disclosure to those skilled in the art. In these examples temperatures are given in degrees centigrade (° C.) and quantities of materials in parts by weight unless otherwise noted.

EXAMPLE 1

A solution containing 76.4 parts of dimethyl 3-oxoundecane-1,11-dioate in 400 parts by volume of cold 10% aqueous potassium hydroxide is allowed to stand at 0–5° for about 4 days, then is neutralized to pH 8 by the addition of solid carbon dioxide. To that solution is then added 132 parts by volume of an aqueous solution, adjusted to pH 8, containing 19.6 parts of pyruvic aldehyde. The resulting reaction mixture is allowed to stand at room temperature, under nitrogen, for about 53 hours, then is washed with ether, acidified with hydrochloric acid, saturated with sodium chloride and extracted with ether. That ether extract is washed with saturated aqueous sodium chloride, then concentrated to dryness. The resulting residue is dissolved in cold 5% aqueous sodium hydroxide, then kept under nitrogen at room temperature for about 6 hours. Acidification of the mixture with concentrated hydrochloric acid followed by saturation of the solution with sodium chloride and extraction with ether affords an organic solution containing 3-hydroxy-2-methyl-5-oxocyclopent-1-eneheptanoic acid. To that solution is then added an ethereal solution containing 33.6 parts of diazomethane so that the total volume is approximately 1000 parts. That reaction mixture is allowed to stand at room temperature for about 1 minute, then is washed successively with dilute acetic acid, dilute aqueous sodium bicarbonate and water, dried over anhydrous sodium sulfate and stripped of solvent by distillation under reduced pressure. Distillation of the resulting residue at 0.5 mm. pressure affords methyl 3-hydroxy-2-methyl-5-oxocyclopent-1-eneheptanoate, boiling at 180–205°. It displays infrared absorption peaks, in chloroform, at about 2.71, 2.83, 5.73, 5.82 and 6.02 microns and an ultraviolet absorption maximum at about 231.5 millimicrons with a molecular extinction coefficient of about 12,000. This compound is represented by the following structural formula

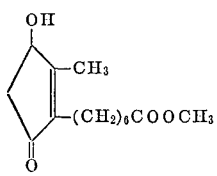

EXAMPLE 2

A mixture containing 2.5 parts of methyl 3-hydroxy-2-methyl-5-oxocyclopent-1-eneheptanoate, 0.5 part of sodium hydroxide and 50 parts by volume of 90% aqueous methanol is allowed to stand at room temperature for about 16 hours, then is diluted with water and acidified by the addition of hydrochloric acid. Extraction of that acidic solution with ether affords an organic solution, which is washed with saturated aqueous sodium chloride, dried over anhydrous sodium sulfate, stripped of solvent under reduced pressure and dried to afford 3-hydroxy-2-methyl-5-oxocyclopent-1-eneheptanoic acid. This compound exhibits infrared absorption maxima, in chloroform, at about 5.82, and 6.05 microns and an ultraviolet absorption maximum at 232 millimicrons with a molecular extinction coefficient of about 12,100. It is represented by the following structural formula

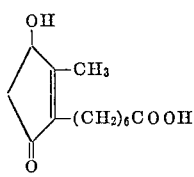

EXAMPLE 3

A mixture consisting of 16.1 parts of methyl 3-hydroxy-2-methyl-5-oxocyclopent-1-eneheptanoate, 14 parts of acetic anhydride and 30 parts of pyridine is stored at room temperature for about 2 days, then is poured into a mixture of ice and water. Extraction of that mixture with ether affords an organic solution, which is washed successively with dilute hydrochloric acid, water and aqueous potassium carbonate, then dried over anhydrous sodium sulfate and distilled under reduced pressure. The colorless oil boiling at 157–159° under 0.04 mm. pressure is methyl 3-acetoxy-2-methyl-5-oxocyclopent-1-eneheptanoate. It exhibits infrared absorption maxima, in chloroform, at about 5.76 and 6.02 microns and an ultraviolet absorption peak at about 229.5 millimicrons with a molecular extinction coefficient of about 13,900. This compound is represented by the following structural formula

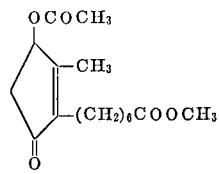

EXAMPLE 4

To a mixture containing 10.2 parts of methyl 3-hydroxy-2-methyl-5-oxocyclopent-1-eneheptanoate, 40 parts of methylene chloride and 20 parts of water is added, at a temperature between —5 and 0° with stirring, a mixture containing 4.5 parts of chromium trioxide, 13.2 parts of concentrated sulfuric acid and 20 parts of water. After completion of the addition, the mixture is stirred for approximately 1 hour at a temperature between —5 and 0°, then is extracted with chloroform. The chloroform extract is washed successively with saturated aqueous sodium chloride and dilute aqueous sodium bicarbonate, then dried over anhydrous sodium sulfate and stripped of solvent under reduced pressure. The resulting crude product is purified by chromatography on silica gel followed by elution with 10% ethyl acetate in benzene. The eluate is stripped of solvent, then distilled at 0.2 mm. pressure to afford methyl 2-methyl-3,5-dioxocyclopent-1-eneheptanoate, boiling at about 156°. This compound exhibits an ultraviolet absorption maximum at about 245.5 millimicrons with a molecular extinction coefficient of about 14,100. It is represented by the following structural formula

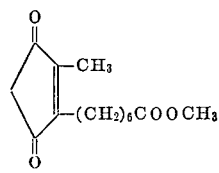

EXAMPLE 5

A mixture containing 17.6 parts of 3-hydroxy-2-methyl-5-oxocyclopent-1-eneheptanoic acid, 80 parts of methylene chloride and 40 parts of water is cooled to a temperature between —5 and 0° and a mixture containing 9 parts of chromium trioxide, 27.6 parts of concentrated sulfuric acid and 40 parts of water is slowly added at 0–5°. That reaction mixture is stirred for approximately 2 hours at about —5°, then at 10° for about 10 minutes and finally is extracted with chloroform. The extract is washed with dilute aqueous sodium chloride, then dried over anhydrous sodium sulfate, stripped of solvent and distilled under reduced pressure. There is thus obtained 2-methyl-3,5-dioxocyclopent-1-eneheptanoic acid, boiling at 195–197° at 0.1 mm. pressure. This compound exhibits an ultraviolet absorption maximum at about 245 millimicrons with a molecular extinction coefficient of about 11,900 and is represented by the following structural formula

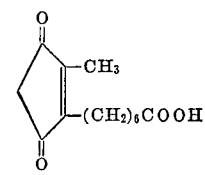

EXAMPLE 6

When an equivalent quantity of diazoethane is substituted in the procedure of Example 1, there is produced ethyl 3-hydroxy-2-methyl-5-oxocyclopent-1-eneheptanoate.

EXAMPLE 7

The substitution of equivalent quantities of ethyl 3-hydroxy-2-methyl-5-oxocyclopent-1 - eneheptanoate and propionic anhydride in the procedure of Example 3 results in ethyl 2 - methyl-5-oxo-3-propionoxycyclopent-1-eneheptanoate.

EXAMPLE 8

By substituting an equivalent quantity of ethyl 3-hydroxy-2-methyl - 5 - oxocyclopent-1-eneheptanoate and otherwise proceeding according to the processes described in Example 4, there is produced ethyl 2-methyl-3,5-dioxocyclopent-1-eneheptanoate.

EXAMPLE 9

The substitution of an equivalent quantity of 3-hydroxy-2-methyl - 5 - oxocyclopent-1-eneheptanoic acid in the procedure of Example 3 results in 3-acetoxy-2-methyl-5-oxocyclopent-1-eneheptanoic acid.

What is claimed is:

1. A compound of the formula

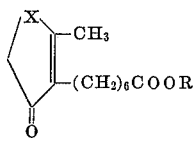

wherein R is selected from the group consisting of hydrogen and a lower alkyl radical and X is selected from the group consisting of carbonyl, hydroxymethylene and (lower alkanoyl)-oxymethylene radicals.

2. As in claim 1, a compound of the formula

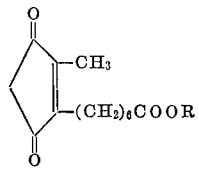

wherein R is selected from the group consisting of hydrogen and a lower alkyl radical.

3. As in claim 1, a compound of the formula

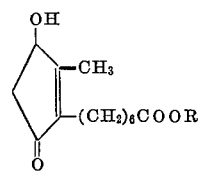

wherein R is selected from the group consisting of hydrogen and a lower alkyl radical.

4. As in claim 1, a compound of the formula

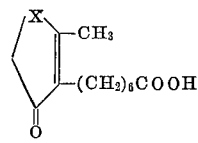

wherein X is selected from the group consisting of carbonyl, hydroxymethylene and (lower alkanoyl)oxymethylene radicals.

5. As in claim 1, a compound of the formula

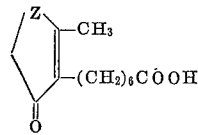

wherein Z is selected from the group consisting of carbonyl and hydroxymethylene radicals.

6. A compound according to claim 1, wherein R is methyl and X is hydroxymethylene, that compound being methyl 3-hydroxy - 2 - methyl-5-oxocyclopent-1-eneheptanoate.

7. A compound according to claim 1, wherein R is hydrogen and X is hydroxymethylene, that compound being 3-hydroxy-2-methyl-5-oxocyclopent-1-eneheptanoic acid.

8. A compound according to claim 1, wherein R is methyl and X is acetoxymethylene, that compound being methyl 3-acetoxy - 2 - methyl-5-oxocyclopent-1-eneheptanoate.

9. A compound according to claim 1, wherein R is methyl and X is carbonyl, that compound being methyl 2-methyl-3,5-dioxocyclopent-1-eneheptanoate.

10. A compound according to claim 1, wherein R is hydrogen and X is carbonyl, that compound being 2-methyl-3,5-dioxocyclopent-1-eneheptanoic acid.

References Cited

UNITED STATES PATENTS

| | | | |
|---|---|---|---|
| 3,466,319 | 9/1969 | Finch et al. | 260—468 |
| 3,505,387 | 4/1970 | Beal III et al. | 260—468 |

LORRAINE A. WEINBERGER, Primary Examiner

R. GERSTL, Assistant Examiner

U.S. Cl. X.R.

260—488, 514; 424—305, 317